(12) United States Patent
     Rehberger

(10) Patent No.: US 9,944,186 B1
(45) Date of Patent: Apr. 17, 2018

(54) HYBRID TRUCK AND HYBRID TRUCK ACCESSORY

(71) Applicant: FORD GLOBAL TECHNOLOGIES, LLC, Dearborn, MI (US)

(72) Inventor: James Rehberger, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/468,993

(22) Filed: Mar. 24, 2017

(51) Int. Cl.

| | |
|---|---|
| *B60L 8/00* | (2006.01) |
| *H02S 99/00* | (2014.01) |
| *H02S 40/34* | (2014.01) |
| *H02S 40/38* | (2014.01) |
| *B60L 11/18* | (2006.01) |
| *B60R 16/023* | (2006.01) |
| *B60L 1/02* | (2006.01) |
| *B60K 6/42* | (2007.10) |
| *B60K 6/26* | (2007.10) |
| *B60K 6/387* | (2007.10) |
| *B60K 6/36* | (2007.10) |
| *B60K 6/28* | (2007.10) |

(52) U.S. Cl.
CPC ............ *B60L 8/003* (2013.01); *B60L 1/02* (2013.01); *B60L 11/1803* (2013.01); *B60R 16/0231* (2013.01); *H02S 40/34* (2014.12); *H02S 40/38* (2014.12); *H02S 99/00* (2013.01); *B60K 6/26* (2013.01); *B60K 6/28* (2013.01); *B60K 6/36* (2013.01); *B60K 6/387* (2013.01); *B60K 6/42* (2013.01); *B60L 2210/40* (2013.01); *Y10S 903/906* (2013.01); *Y10S 903/907* (2013.01); *Y10S 903/909* (2013.01); *Y10S 903/914* (2013.01)

(58) Field of Classification Search
CPC ... B60L 8/003; H02S 40/34; B60J 7/10; B60J 7/14; B60J 7/141; B60J 7/1607; B60J 7/185; B60J 7/19; B60J 7/198
See application file for complete search history.

(56) References Cited

U.S. PATENT DOCUMENTS

| | | | | |
|---|---|---|---|---|
| 3,255,047 | A * | 6/1966 | Escoffery | H01L 31/042 136/244 |
| 5,277,602 | A * | 1/1994 | Yi | H01R 13/7036 439/138 |
| 5,636,893 | A * | 6/1997 | Wheatley | B60J 7/141 16/354 |
| 7,090,520 | B2 * | 8/2006 | Matsukawa | H01R 13/193 200/51.09 |

(Continued)

FOREIGN PATENT DOCUMENTS

FR   2943017 B1 * 9/2012 ............ B60J 7/1607

*Primary Examiner* — James A Shriver, II
*Assistant Examiner* — Steve Clemmons
(74) *Attorney, Agent, or Firm* — David Kelley; Brooks Kushman P.C.

(57) ABSTRACT

A vehicle includes a cargo bed, first open electrical circuit, and tonneau cover. The cargo bed has first and second sides extending upward. The first open electrical circuit has a battery and extends from a first electrical receptacle defined by the first side to a second electrical receptacle defined by the second side. The tonneau cover has a photovoltaic panel. The tonneau cover also has first and second electrical connectors that engage the first and second receptacles, respectively, to connect the photovoltaic panel to and close the first open circuit.

10 Claims, 4 Drawing Sheets

(56) References Cited

U.S. PATENT DOCUMENTS

| | | | | |
|---|---|---|---|---|
| 7,445,275 B2* | 11/2008 | Woodhouse | B60L 8/00 | |
| | | | 136/251 | |
| 7,884,569 B2* | 2/2011 | Ward | B60L 8/003 | |
| | | | 180/2.1 | |
| 8,120,308 B2* | 2/2012 | Ward | B60L 8/003 | |
| | | | 180/2.1 | |
| 8,376,446 B2* | 2/2013 | Golden | B60J 7/041 | |
| | | | 296/100.01 | |
| 9,039,434 B2* | 5/2015 | Winningham | H01R 13/521 | |
| | | | 439/271 | |
| 9,090,163 B2* | 7/2015 | Syed | B60L 8/003 | |
| 9,487,071 B1* | 11/2016 | Yue | B60J 7/198 | |
| 9,496,751 B2* | 11/2016 | Syed | B60K 16/00 | |
| 9,728,664 B2* | 8/2017 | Doech | H01L 31/05 | |
| 2008/0100258 A1 | 5/2008 | Ward | | |
| 2009/0288891 A1 | 11/2009 | Budge | | |
| 2010/0275976 A1* | 11/2010 | Rubin | H01L 31/02008 | |
| | | | 136/251 | |
| 2012/0186622 A1* | 7/2012 | Dassanayake | H01L 31/03926 | |
| | | | 136/244 | |
| 2013/0328348 A1* | 12/2013 | Agnew | B60K 16/00 | |
| | | | 296/136.03 | |
| 2015/0180178 A1* | 6/2015 | Ranka | B60R 9/058 | |
| | | | 403/299 | |
| 2015/0251539 A1 | 9/2015 | Sura et al. | | |

* cited by examiner

HYBRID TRUCK AND HYBRID TRUCK ACCESSORY

TECHNICAL FIELD

The present disclosure relates to hybrid or electric vehicles, and more particularly to hybrid trucks and accessories.

BACKGROUND

A hybrid vehicle may include a traction battery that can either receive electrical power from or deliver electrical power to an electric machine. The electric machine may be used to propel the vehicle upon receiving electrical power from the traction battery. Fuel efficiency may be increased by increasing the electrical charge of the traction battery, resulting in longer periods of time that the electric machine may be used to propel the vehicle.

SUMMARY

A vehicle includes a cargo bed, first open electrical circuit, and tonneau cover. The cargo bed has first and second sides extending upward. The first open electrical circuit has a battery and extends from a first electrical receptacle defined by the first side to a second electrical receptacle defined by the second side. The tonneau cover has a photovoltaic panel. The tonneau cover also has first and second electrical connectors that engage the first and second receptacles, respectively, to connect the photovoltaic panel to and close the first open circuit.

A truck bed tonneau cover includes a photovoltaic unit and a fastening system. The photovoltaic unit is disposed on an outer panel. The fastening system is disposed about a periphery of the outer panel. The fastening system is configured to secure the cover to upward extending first and second sides of a truck bed. The fastening system has first and second electrical connectors that are configured to connect the photovoltaic unit to a first truck battery.

A hybrid truck includes a traction battery, electric machine, cargo bed, first electrical circuit, and bed cover. The traction battery is configured to power the electric machine. The first electrical circuit is connected to the traction battery. The first electrical circuit extends from a first to a second electrical receptacle defined by the cargo bed. The bed cover has a photovoltaic panel. The bed cover also has first and second electrical connectors that engage the first and second receptacles, respectively, to connect the photovoltaic panel to the traction battery via the first circuit.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
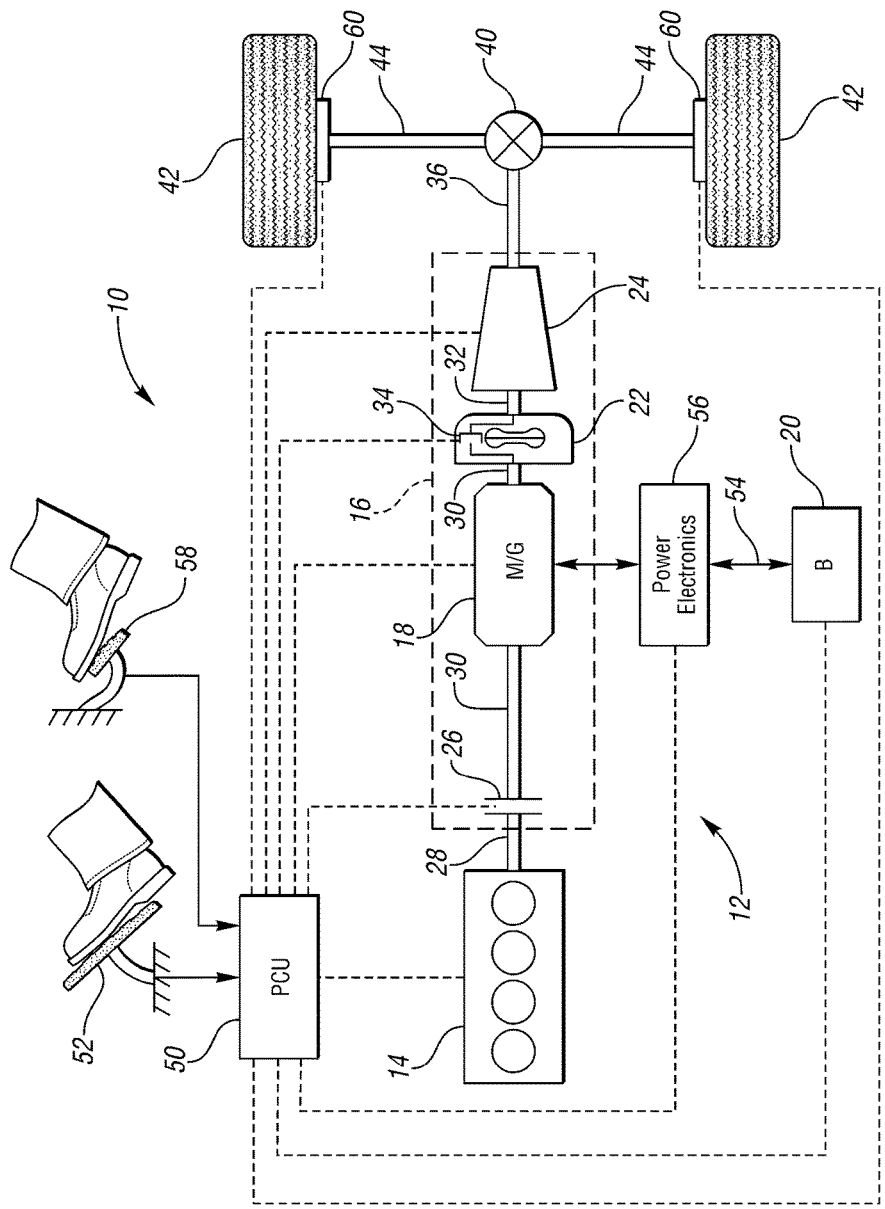
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to vehicles powered by internal combustion engines, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2A:
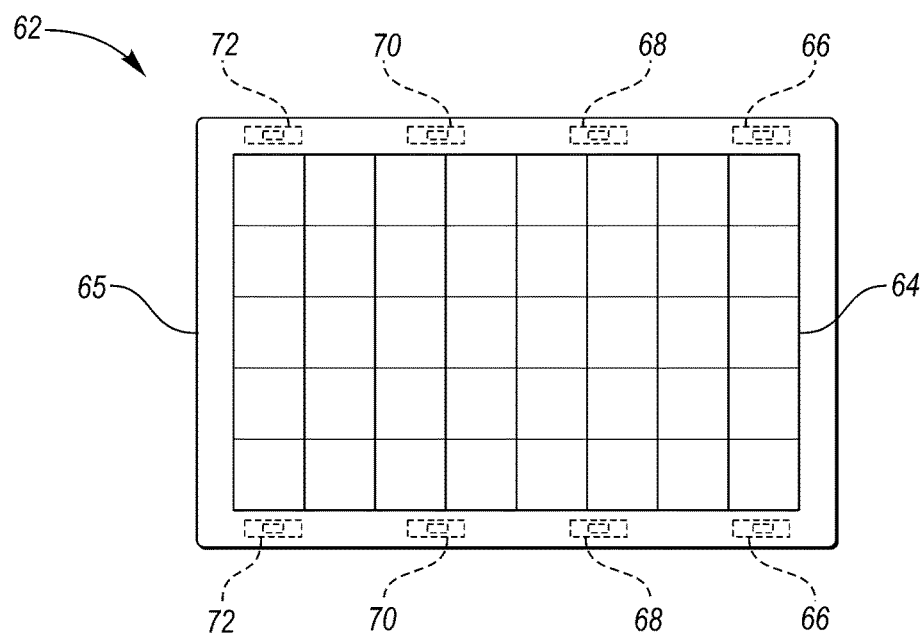
FIGS. 2A-2C are top, side, and front views, respectively, of a representative tonneau cover that includes a photovoltaic unit.
Figure 2B:
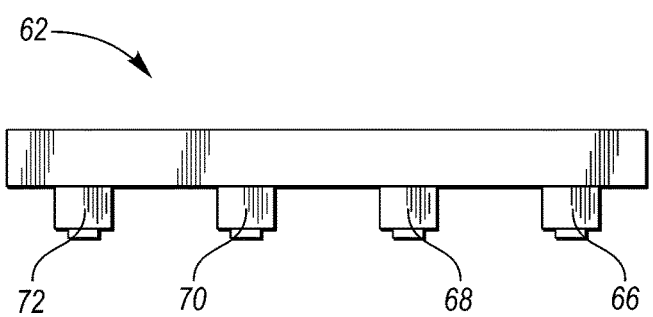
Figure 2C:
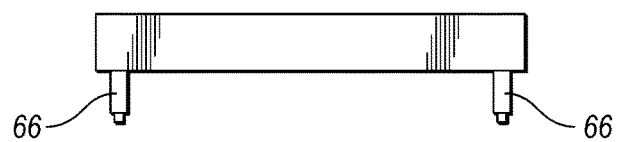

Referring to FIG. 2A-2C, a represented tonneau cover 62 is illustrated. The tonneau cover 62 may also be referred to as a bed cover, truck bed cover, or truck bed tonneau cover. The tonneau cover 62 may include a photovoltaic panel (or photovoltaic unit) 64 disposed on an outer panel 65. The tonneau cover 60 includes a first set of electrical connectors 66, second set of electrical connectors 68, third set of electrical connectors 70, and fourth set of electrical connectors 72. The first set of electrical connectors 66 may be referred to as the first and second electrical connectors, the second set of electrical connectors 68 may be referred to as the third and fourth electrical connectors, the third set of electrical connectors 70 may be referred to as the fifth and sixth electrical connectors, and the fourth set of electrical connectors 72 may be referred to as the seventh and eighth electrical connectors. Each set of electrical connectors may be configured to connect the photovoltaic panel 64 to an open circuit that includes a battery, such that electrical energy converted from light energy by the photovoltaic panel 64 charges a battery. Although the depicted embodiment includes exactly four sets of electrical connectors, the disclosure should be construed to include tonneau covers having one or more sets of electrical connectors.

Each set of electrical connectors may be configured to connect the photovoltaic panel 64 to a particular open circuit of a particular vehicle model, the open circuit including a battery, so that the photovoltaic panel 64 may charge the battery of the particular vehicle model. The battery may be a traction battery (such as battery 20) of a hybrid vehicle, which may also be referred to as a high-voltage battery. Alternatively, the battery may be a low-voltage battery that is configured to power engine starter motors, control panels, radios, HVAC air blowers, other entertainment systems (i.e., television or DVD/Blue ray player), and any other vehicle accessory. Electrical connectors may be retractable, or designed to not interfere with the physical design of non-hybrid truck beds to allow tonneau covers to be used with a wider range of trucks and perform as standard non-photovoltaic covers.

Figure 3:
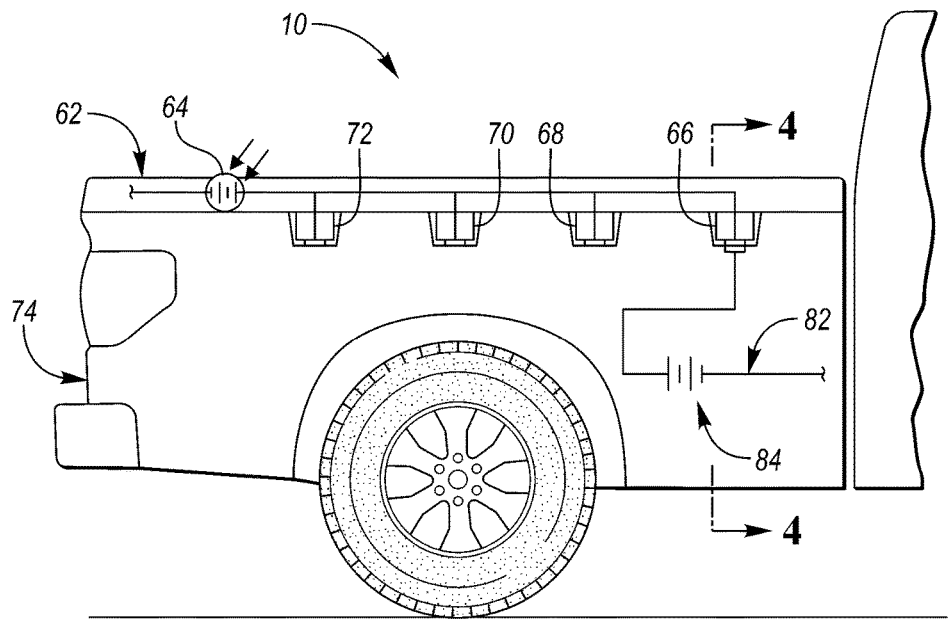
FIG. 3 is a schematic illustration of a side view of the hybrid electric vehicle.
Figure 4:
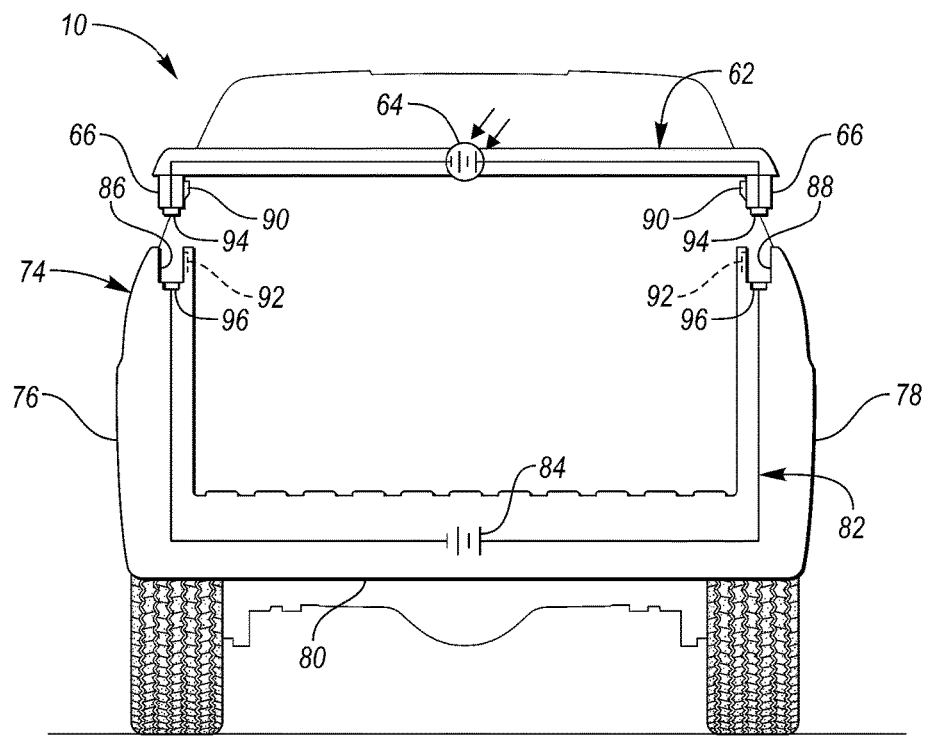
FIG. 4 is a cross-sectional view taken along line 4-4 in FIG. 3.

Referring to FIGS. 3 and 4, a side view and a rear view of the HEV 10, respectively, are illustrated. The HEV 10 may be a hybrid truck that includes a cargo bed (or truck bed) 74. The cargo bed 74 may include a first side 76 and a second side 78 that extend upward from a bed floor 80. The HEV 10 may include a first open electrical circuit 82 that includes a battery 84. The battery 84 may be the traction battery 20 or a low-voltage battery, as discussed above. The first open electrical circuit 82 extends from a first electrical receptacle 86 defined by the first side 76 of the truck bed 74 to a second electrical receptacle 88 defined by the second side 78 of the truck bed 74. The first and second electrical connectors (i.e., the first set of electrical connectors 66) may be disposed within or engage the first electrical receptacle 86 and second electrical receptacle 88, respectively, closing the first open electrical circuit 82 and connecting the photovoltaic panel 64 to the battery 84.

The tonneau cover 62 may include a fastening system that engages the first electrical receptacle 86 and second electrical receptacle 88 to secure the tonneau cover 62 to a top of the cargo bed 74. The fastening system may specifically refer to or may include the first and second electrical connectors (i.e., the first set of electrical connectors 66). For example, the fastening system may include the electrical connectors 66 which in turn may include retractable clips 90 that engage slots 92 defined by the cargo bed 74, the slots 92 being adjacent to the first electrical receptacle 86 and second electrical receptacle 88. The fastening system may include a first set of metal contacts 94. The first open electrical circuit 82 may include a second set of metal contacts 96 that are disposed within the first electrical receptacle 86 and second electrical receptacle 88. The fastening system may engage the first electrical receptacle 86 and second electrical receptacle 88 such that the first set of metal contacts 94 engages the second set of metal contacts 96 to close the first open electrical circuit 82 and connect the photovoltaic panel 64 to the battery 84.

The second set of electrical connectors 68 may be configured to connect the photovoltaic panel 64 to a second battery that is a component of a second vehicle (or truck), the third set of electrical connectors 70 may be configured to connect the photovoltaic panel 64 to a third battery that is a component of a third vehicle (or truck), and the fourth set of electrical connectors 72 may be configured to connect the photovoltaic panel 64 to a fourth battery that is a component of a fourth vehicle (or truck). The second, third, and fourth sets of electrical connectors may close second, third, and fourth open circuits and connect the photovoltaic panel 64 to the second, third, and fourth batteries (which may be a traction battery or a low-voltage battery), respectively, in the same manner that the first set of electrical connectors 66 closes the first open electrical circuit 82 and connects the photovoltaic panel 64 to the battery 84 of the HEV 10, as described above. Each set of electrical connectors may also act as a fastening mechanism in the same manner as the first set of connectors 66, as described above, regardless if they are connecting the photovoltaic panel 64 to a battery of particular vehicle.

The first set of connectors 66 is shown in FIG. 3, to close the first open electrical circuit 82 and connect the photovoltaic panel 64 to the battery 84, while the second set of electrical connectors 68, third set of electrical connectors 70, and fourth set of electrical connectors 72 are shown not to close the first open electrical circuit 82 and connect the photovoltaic panel 64 to the battery 84. Similar configurations may be true for each set of electrical connectors. For example, the second set of electrical connectors 68 may be the only set of the four sets of connectors configured to close a second electric circuit and connect the photovoltaic panel 64 to the second battery of the second vehicle, the third set of electrical connectors 70 may be the only set of the four sets of connectors configured to close a third electric circuit and connect the photovoltaic panel 64 to the third battery of the third vehicle, and the fourth set of electrical connectors 72 may be the only set of the four sets of connectors configured to close a fourth electric circuit and connect the photovoltaic panel 64 to the fourth battery of the fourth vehicle.

Figure 5:
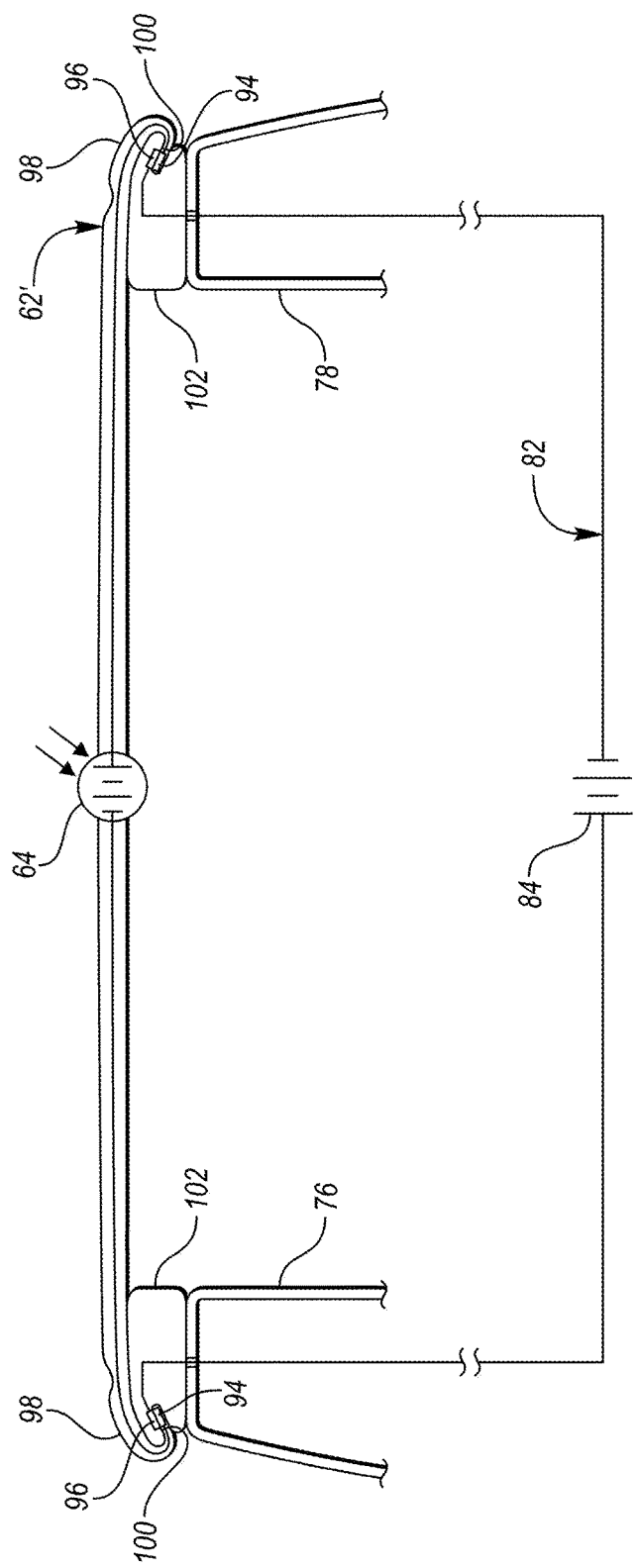
FIG. 5 is a cross-sectional view of an alternative embodiment of the tonneau cover.

Referring to FIG. 5, a cross-sectional view of an alternative embodiment of the tonneau cover 62' is illustrated. Cross-hatching has been omitted for illustrative purposes. The alternative embodiment of the tonneau cover 62' includes all the elements of tonneau cover 62 unless otherwise described herein. The fastening system in alternative embodiment of the tonneau cover 62' includes a plurality of hooks 98 that are disposed about the periphery of the tonneau cover 62'. The hooks 98 engage slots 100 defined by top covers 102 disposed on the tops of the first side 76 and second side 78 of the cargo bed 74. The first set of metal contacts 94 are disposed on the hooks 98 of the fastening system while the second set of metal contacts 96 are disposed in the slots 100 defined by the top covers 102. The hooks 98 may engage slots 100 such that the first set of metal contacts 94 engages the second set of metal contacts 96 to close the first open electrical circuit 82 and connect the photovoltaic panel 64 to the battery 84. The alternative embodiment of the tonneau cover 62' may also include multiple sets of electrical connectors (e.g., the combination of the hooks 98 and metal contacts 94) configured to connect the photovoltaic panel 64 to a particular open circuit and battery of a particular vehicle or vehicle model, in the same manner described above. Also, each set of electrical connectors may only function to connect the photovoltaic panel 64 to the particular open circuit and battery of a particular vehicle or vehicle model and not to connect the photovoltaic panel 64 to a particular open circuit and battery of other vehicles or vehicle models, in the same manner described above.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a cargo bed having first and second sides extending upward;
   first and second top covers disposed on tops of the first and second sides and defining first and second slots, respectively;
   a first open electrical circuit having a battery, extending from the first to the second slot, and having a first set of electrical contacts disposed in the first and second slots; and
   a tonneau cover having
     a photovoltaic panel, and
     a plurality of fastening hooks disposed on a periphery of the tonneau cover, having a second set of electrical contacts, and engaging the first and second slots such that the tonneau cover is secured to the cargo bed and such that the first set of electrical contacts engages the second set of electrical contacts to connect the photovoltaic panel to and close the first open circuit.

2. The vehicle of claim 1, wherein the tonneau cover includes a third set of electrical contacts that are configured to connect the photovoltaic panel to and close a second open circuit that includes a second battery.

3. The vehicle of claim 2, wherein the third set of electrical contacts are configured to not connect the photovoltaic panel to and close the first open circuit, and wherein the second set of electrical contacts are configured to not connect the photovoltaic panel to and close the second open circuit.

4. The vehicle of claim 1 further comprising an electric machine configured to propel the vehicle, and wherein the battery is configured to deliver electrical power to the electric machine.

5. A tonneau cover comprising:
   a photovoltaic unit disposed on an outer panel; and
   a plurality of hooks disposed about a periphery of the outer panel, configured to engage slots defined in top covers disposed on opposing sides of a truck bed to secure the cover to the bed, and having a first set of electrical contacts configured to engage mating electrical contacts in the slots to connect the photovoltaic unit to a first battery.

6. The tonneau cover of claim 5, wherein the plurality of hooks includes a second set of electrical contacts that are configured to connect the photovoltaic unit to a second battery.

7. The tonneau cover of claim 6, wherein the second set of electrical contacts are not configured to connect the photovoltaic unit to the first battery, and wherein the first set of electrical contacts are not configured to connect the photovoltaic unit to the second battery.

8. A hybrid truck comprising:
   a traction battery configured to power an electric machine;
   a cargo bed;
   first and second top covers disposed on opposing sides of the cargo bed and defining first and second slots, respectively;
   a first electrical circuit connected to the traction battery, extending from the first to the second slot, and having a first set of electrical contacts disposed in the first and second slots; and
   a bed cover having
     a photovoltaic panel, and
     a plurality of fastening hooks disposed on a periphery of the cover, having a second set of electrical contacts, and engaging the first and second slots such that the cover is secured to the cargo bed and such that the first set of electrical contacts engages the second set of electrical contacts to connect the photovoltaic panel to and close the first open circuit.

9. The truck of claim 8, wherein the bed cover includes a third set of electrical contacts that are configured to connect the photovoltaic panel to a second battery via a second circuit.

10. The truck of claim 9, wherein the third set of electrical contacts are configured to not connect the photovoltaic panel to the traction battery, and wherein the second set of electrical contacts are configured to not connect the photovoltaic panel to the second battery.

* * * * *